US012342148B2

(12) United States Patent
Mitsui et al.

(10) Patent No.: US 12,342,148 B2
(45) Date of Patent: Jun. 24, 2025

(54) SOFTWARE AND MICROPHONE DEVICE

(71) Applicant: ZOOM CORPORATION, Tokyo (JP)

(72) Inventors: Tomokazu Mitsui, Tokyo (JP); Yudai Shinkai, Tokyo (JP)

(73) Assignee: ZOOM CORPORATION, Tokyo (JP)

( * ) Notice: Subject to any disclaimer, the term of this patent is extended or adjusted under 35 U.S.C. 154(b) by 190 days.

(21) Appl. No.: 18/119,322

(22) Filed: Mar. 9, 2023

(65) Prior Publication Data

US 2023/0292072 A1 Sep. 14, 2023

(30) Foreign Application Priority Data

Mar. 10, 2022 (JP) ................................ 2022-036923

(51) Int. Cl.
*H04S 5/02* (2006.01)
*H04R 5/027* (2006.01)
*H04R 5/04* (2006.01)

(52) U.S. Cl.
CPC ............... *H04S 5/02* (2013.01); *H04R 5/027* (2013.01); *H04R 5/04* (2013.01); *H04S 2420/11* (2013.01)

(58) Field of Classification Search
None
See application file for complete search history.

(56) References Cited

U.S. PATENT DOCUMENTS

| | | | | |
|---|---|---|---|---|
| 10,820,133 B2 * | 10/2020 | Zhang | .................... | H04R 3/005 |
| 10,856,094 B2 * | 12/2020 | Sun | ........................ | H04R 3/005 |
| 11,418,872 B2 * | 8/2022 | Nakamura | ............. | H04R 1/326 |
| 11,632,626 B2 * | 4/2023 | Taghizadeh | ............... | H04S 3/02<br>704/218 |
| 11,736,881 B2 * | 8/2023 | Kasugai | .................. | H04S 5/005<br>381/302 |
| 11,937,075 B2 * | 3/2024 | Fuchs | ...................... | H04S 3/008 |
| 2013/0177168 A1 * | 7/2013 | Inha | ........................ | H04S 7/303<br>381/92 |
| 2020/0112790 A1 * | 4/2020 | Kudoh | .................... | G06F 3/012 |
| 2020/0245064 A1 * | 7/2020 | Awano | ................... | H04R 3/005 |

FOREIGN PATENT DOCUMENTS

JP 2019140517 A 8/2019

* cited by examiner

*Primary Examiner* — Paul W Huber
(74) *Attorney, Agent, or Firm* — The Webb Law Firm

(57) ABSTRACT

A software of the present invention causes a processor to execute a process including converting an A format signal applicable to ambisonics to a B format signal; distinguishing a specific direction from a plurality of directions based on the B format signal; and generating and outputting an audio signal corresponding to the specific direction. Also disclosed is a microphone including the software.

7 Claims, 9 Drawing Sheets

W=FLU+FRD+BLD+BRU
X=FLU+FRD−BLD−BRU
Y=FLU−FRD+BLD−BRU
Z=FLU−FRD−BLD+BRU

SOFTWARE AND MICROPHONE DEVICE

CROSS-REFERENCE TO RELATED APPLICATION

This application claims priority to Japanese Patent Application No. 2022-036923 filed Mar. 10, 2022, the disclosure of which is hereby incorporated by reference in its entirety.

BACKGROUND OF THE INVENTION

Field of the Invention

The present invention relates to software causing a processor to execute a process for generating and outputting an audio signal corresponding to a specific direction based on a B format signal in ambisonics and a microphone device with the software installed therein.

Description of Related Art

Conventionally, conference call systems and web conference systems are known to allow those at a distance to communicate each other. The conference call systems are configured to provide audio communication through telephone lines using dedicated terminal equipment provided with a microphone and a speaker. Meanwhile, the web conference systems are configured to provide audio and visual communication through the internet network using, for example, general purpose personal computers provided with a microphone, a speaker, and a camera (hereinafter, such a conference call system and a web conference system are referred to as "conference systems").

Due to the prevalence of the novel coronavirus infection (COVID-19) occurred in late November, 2019, free movement of people is restricted. As a result, the conference systems as described above are used daily inside and outside Japan.

PRIOR ART DOCUMENTS

Patent Documents

Patent Document 1: Japanese Patent Kokai Publication No. 2019-140517

SUMMARY OF THE INVENTION

Technical Problem

1. Sound Produced by Another Participant

In a conference across distant locations using the conference system in the past, it is assumed that a plurality of participants are around a microphone in one room at one of the distant location. The conference system in the past does not have a function of telling sound produced by a speaker from sound produced by another participant among the plurality of participants around the microphone. Accordingly, if another participant produces sound while the speaker is producing sound, the conference system in the past picks up both the sound produced by the speaker and the sound produced by the other participant by the microphone and outputs them. For the other party of the conference at the other distant location, the sound produced by the other participant interferes with listening comprehension of the sound produced by the speaker.

2. Echoing Sound in Room

Echoing sound in the room used for the conference also interferes with the sound produced by the speaker. The walls, ceiling, and floor of the room used for the conference produce echoing sound by reflecting the sound produced by the speaker. Meanwhile, in such a conference system, an omnidirectional microphone is often used to pick up sound by a plurality of participants. Such an omnidirectional microphone has equal sensitivity in all directions. The echoing sound in the room is thus omnidirectionally picked up by the omnidirectional microphone. For the other party of the conference at the other distant location, the echoing sound in the room interferes with listening comprehension of the sound produced by the speaker, causing the sound produced by the speaker to be echoed.

3. Various Types of Noise Produced Inside and Outside Room

Various types of noise produced inside and outside the room also interfere with the sound produced by the speaker. For example, in the room used for the conference, the participants of the conference sometimes produce noise, such as the sound of turning sheets of paper, making notes, and coughing. In addition, electric appliances installed in the room sometimes produce noise, such as operating sound and electronic sound. Still in addition, noise is sometimes produced by, for example, a person, an automobile, rain, wind, or the like outside the room. Such a variety of noise produced inside and outside the room is omnidirectionally picked up by the omnidirectional microphone. For the other party of the conference at the other distant location, the various types of noise interfere with listening comprehension of the sound produced by the speaker.

4. Noise in Low Frequency Band

Noise in a low frequency band (approximately 100 Hz or less) also interferes with the sound produced by the speaker. For example, an air conditioner installed in the room used for the conference produces wind noise in the low frequency band. As another example, the speaker breathes on the microphone to sometimes produce pop noise in the low frequency band. The noise in such a low frequency band is picked up by the microphone together with the sound produced by the speaker. For the other party of the conference at the other distant location, the noise in the low frequency band interferes with listening comprehension of the sound produced by the speaker.

5. Object of the Present Invention

The present invention has been made in view of the above problems and it is an object thereof to provide software capable of selectively outputting sound produced from a specific direction in a space where a microphone is installed and a microphone device with the software installed therein.

Solution to Problem (A) To achieve the above object, software of the present invention causes a processor to execute a process including: converting an A format signal applicable to ambisonics to a B format signal; distinguishing a specific direction from a plurality of directions based on the B format signal; and generating and outputting an audio signal corresponding to the specific direction.

(B) It is preferred that, in the software of (A) above, the software causes the processor to execute: a first process of converting the A format signal to the B format signal, the A format signal being converted to a digital signal in advance; a second process of generating a plurality of signals corresponding to the plurality of directions based on the B format signal; a third process of distinguishing the specific direction corresponding to a largest signal of the plurality of signals; and a fourth process of generating and outputting the audio signal corresponding to the specific direction based on the B format signal.

(C) It is preferred that, in the software of (A) above, the software causes the processor to execute: in the second process, a process of calculating an envelope of each of the plurality of signals corresponding to the plurality of directions; and in the third process, a process of distinguishing the specific direction corresponding to a largest signal based on the envelope.

(D) It is preferred that, in the software of (B) or (C) above, the software causes the processor to execute: in the first process, a process of memorizing the B format signal converted from the A format signal; and in the fourth process, a process of generating the audio signal corresponding to the specific direction based on the memorized B format signal.

(E) To achieve the above object, a microphone device of the present invention with the software of any one of (A) through (D) above installed therein, the device includes: a body of the microphone; at least four or more microphone elements provided facing sound pickup directions different from each other in the body and configured to output audio signals to be components of the A format signal; an amplifier configured to amplify the audio signals outputted from the four or more microphone elements; an A/D converter configured to convert each audio signal amplified by the amplifier to a digital signal; and the processor configured to process the audio signal converted to the digital signal by the A/D converter in accordance with the software.

It should be noted that, regarding the software and the microphone device of the present invention, the terms "sound", "audio", and "voice" are not limited to human voice and include any sound produced from all sound sources.

Advantageous Effects of Invention

The software of the present invention allows selective output of the sound produced from the specific direction in the space where a microphone is installed. That is, the processor configured to execute the process in accordance with the software of the present invention distinguishes the specific direction from which the loudest sound is produced in the space where the microphone is installed and generates and outputs an audio signal corresponding to the specific direction. Audio signals corresponding to directions other than the specific direction are not outputted. Such a process by the software of the present invention may be considered to reproduce the human behavior of directing a microphone to the direction from which the loudest sound is produced by the digital signal process. The microphone device with the software of the present invention installed therein also exhibits the same effects as above.

BRIEF DESCRIPTION OF THE DRAWINGS

FIG. 4A is a front view, FIG. 4B is a rear view, FIG. 4C is a left side view, and FIG. 4D is a right side view.

FIG. 8A is a schematic diagram illustrating a process of picking up sound horizontally through 360°, FIG. 8B is a schematic diagram illustrating a process of sampling at intervals of 45°, and FIG. 8C is a schematic diagram illustrating a process of generating and outputting an audio signal corresponding to 90°.

DESCRIPTION OF THE INVENTION

A description is given below to an embodiment of the software and the microphone device of the present invention with reference to the drawings.

1. Ambisonics

The software and the microphone device of the present invention use the technique of ambisonics. At first, with reference to FIGS. 1A through 3B, the principles of ambisonics are described.

Ambisonics is a technique to record the entire sound throughout peripheral 360° in a space and reproduce the same. Such ambisonics is capable of providing spatial audio containing sound in forward and backward directions, left and right directions, and upward and downward directions. With the proliferation of virtual reality (VR) technique in recent years, ambisonics is used for audio for 360° video.

Figure 1A:
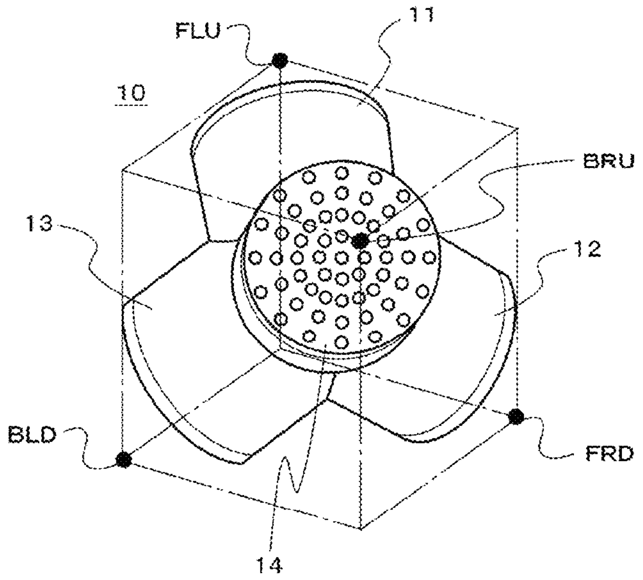
FIG. 1A is a perspective view illustrating a microphone used for ambisonics.
Figure 1B:
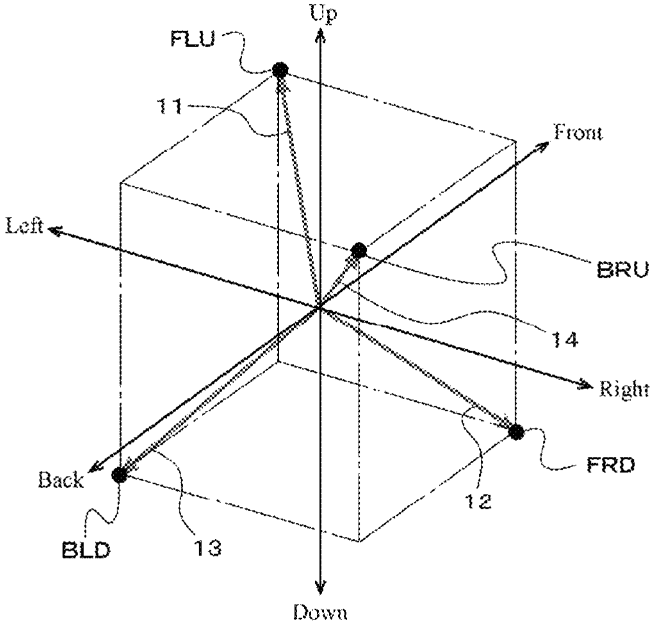
FIG. 1B is a schematic diagram illustrating the orientation of first through fourth microphone elements configuring the microphone.

FIG. 1A illustrates a microphone 10 used for ambisonics. The microphone 10 is provided with first through fourth microphone elements 11 to 14. The first through fourth microphone elements 11 to 14 are provided facing four vertices of a cube illustrated by a dash dotted line in FIG. 1A. FIG. 1B illustrates the orientation of the first through fourth microphone elements 11 to 14. The first microphone element 11 is directed to the upper left front (FLU) of the microphone 10. The second microphone element 12 is directed to the lower right front (FRD) of the microphone 10. The third microphone element 13 is directed to the lower left back (BLD) of the microphone 10. The fourth microphone element 14 is directed to the upper right back (BRU) of the microphone 10.

Figure 2:
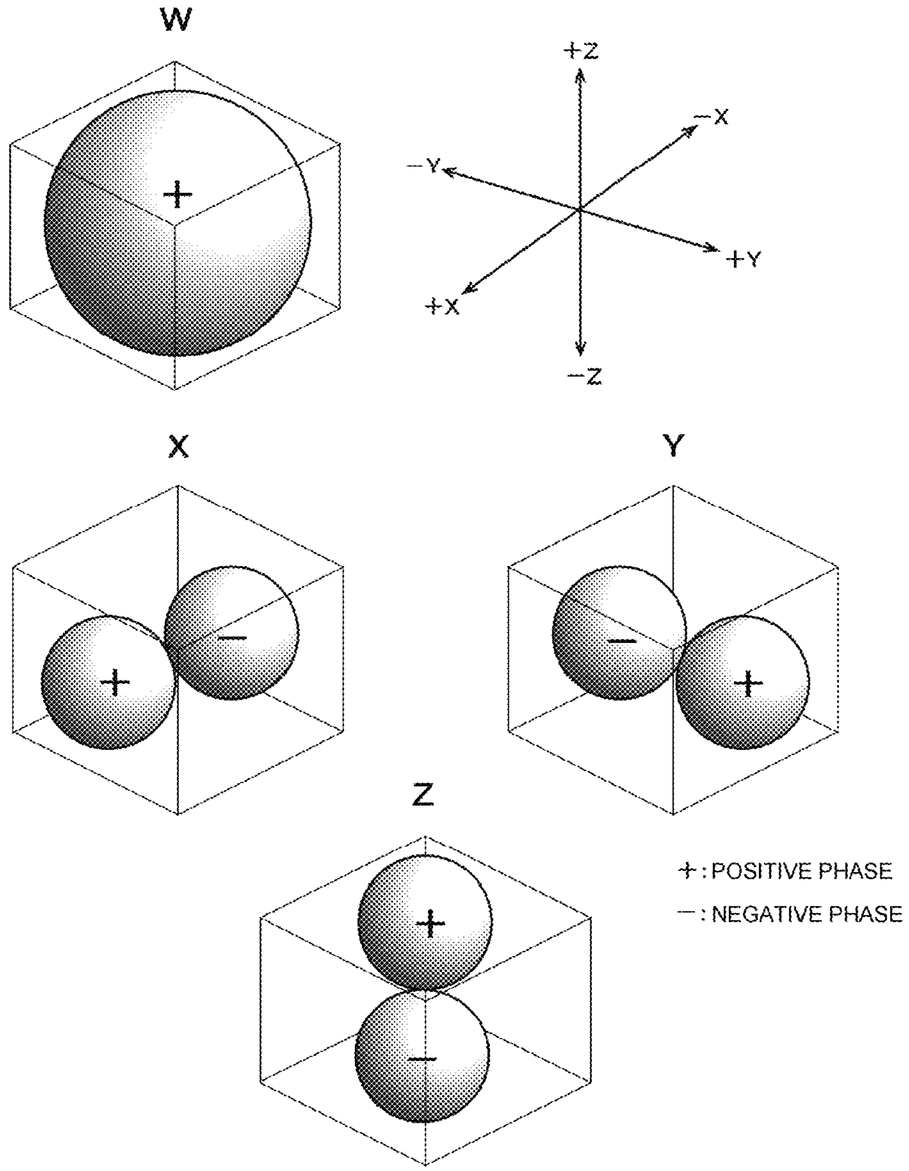
FIG. 2 is a schematic diagram illustrating the directivities of B format signals W, X, Y, and Z.

The first through fourth microphone elements 11 to 14 pick up sound in the four directions of FLU, FRD, BLD, and BRU. Signals of the sound in the four directions of FLU, FRD, BLD, and BRU are called as "A format signals." Such an A format signal is not directly usable and is converted to a "B format signal" with a directivity as illustrated in FIG. 2. Such a B format signal consists of a signal W of sound in all directions, a signal X of sound in the forward and backward directions, a signal Y of sound in the left and right directions, and a signal Z of sound in the upward and downward directions.

The A format signals are converted to the B format signals W, X, Y, and Z by formulae (1) through (4) below.

$$W=FLU+FRD+BLD+BRU \quad (1)$$

$$X=FLU+FRD-BLD-BRU \quad (2)$$

$$Y=FLU-FRD+BLD-BRU \quad (3)$$

$$Z=FLU-FRD-BLD+BRU \quad (4)$$

In the above formulae, W denotes a signal of sound in all directions, X denotes a signal of sound in the forward and backward directions, Y denotes a signal of sound in the left and right directions, Z denotes a signal of sound in the upward and downward directions, FLU denotes a signal of upper left front sound, FRD denotes a signal of lower right front sound, BLD denotes a signal of lower left back sound, and BRU denotes a signal of upper right back sound.

Figure 3A:
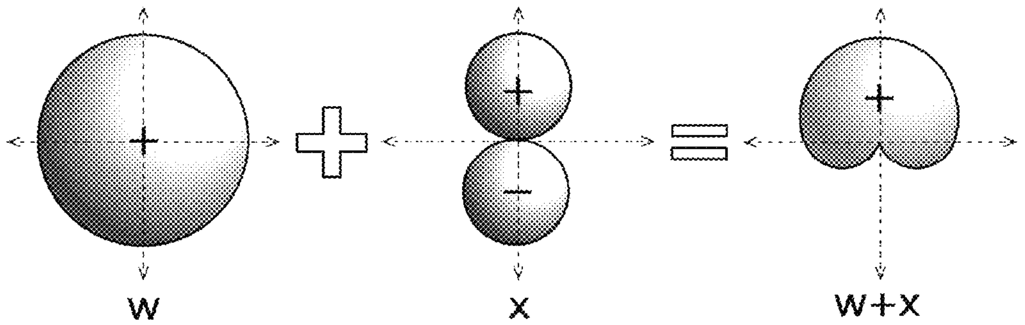
FIG. 3A is a schematic diagram illustrating the directivity in synthesis of the B format signals W and X.
Figure 3B:
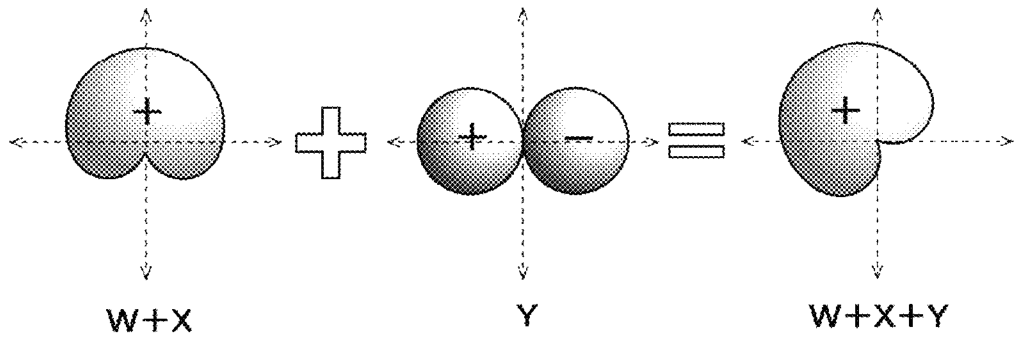
FIG. 3B is a schematic diagram illustrating the directivity in synthesis of the B format signals W, X, and Y.

Synthesis of the B format signals W, X, Y, and Z produces a signal of omnidirectional sound including the forward and backward, left and right, and upward and downward directions. For example, FIG. 3A illustrates the directivity in synthesis of W and X. FIG. 3B illustrates the directivity in synthesis of W, X, and Y. As illustrated in FIG. 3B, synthesis of W, X, and Y generates a signal of sound with a directivity of "45° left forward." Synthesis of the B format signals W, X, Y, and Z based on positional information allows generation of a signal of sound with any directivity among the omnidirectionality including the forward and backward, left and right, and upward and downward directions. Accordingly, based on data of recorded B format signals W, X, Y, and Z, it is possible to freely change the localization of the sound to be played back. Use of such ambisonics for audio for 360° video allows a change in the localization of the played-back sound in accordance with the orientation of the head of a user.

2. Microphone Device

The microphone device with the software of the present embodiment installed therein is then described with reference to FIGS. 4A through 7.

Figure 4A:
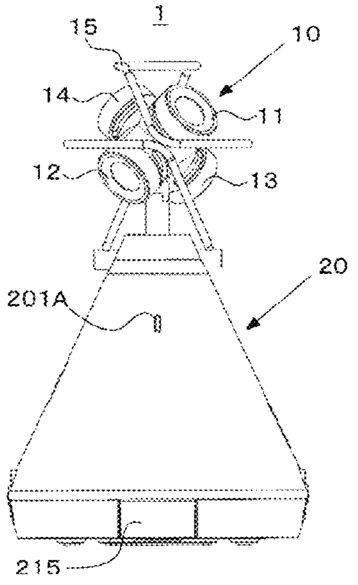
FIGS. 4A through 4D are diagrams illustrating a microphone device according to an embodiment of the present invention.
Figure 4B:
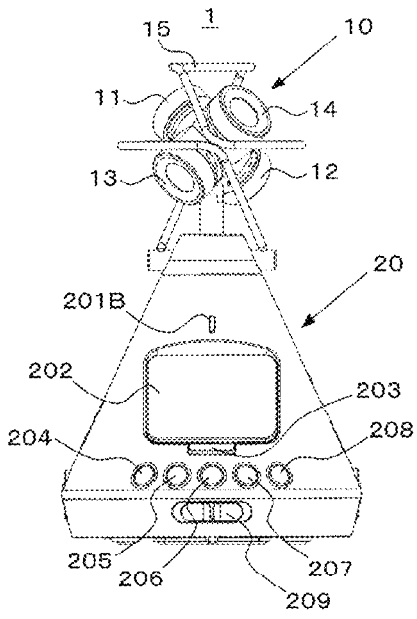
Figure 4C:
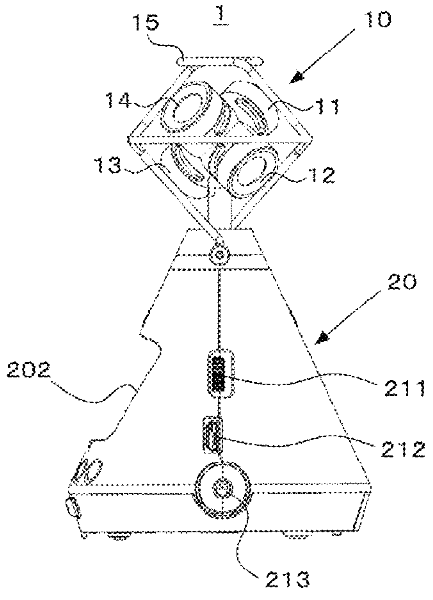
Figure 4D:
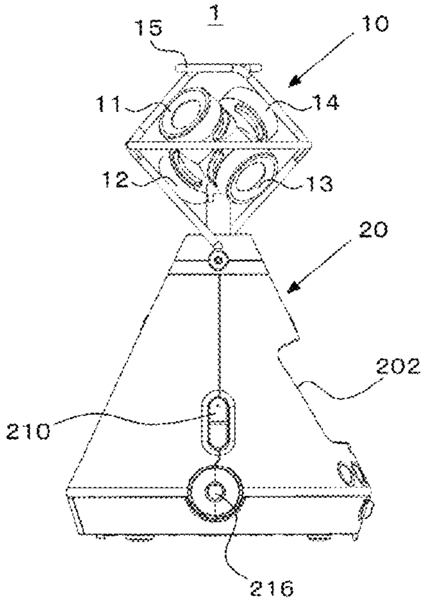
Figure 5A:
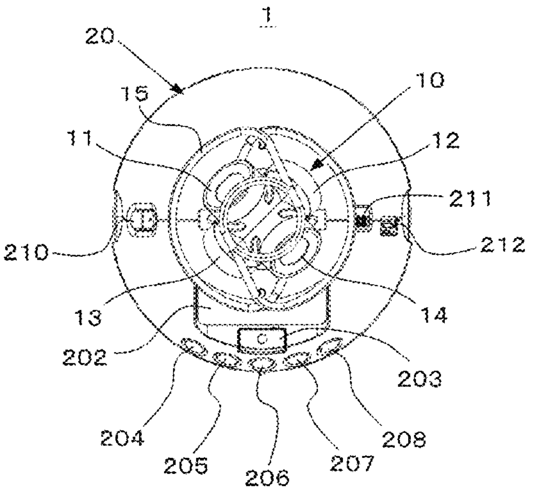
FIG. 5A is a top view of the microphone device.
Figure 5B:
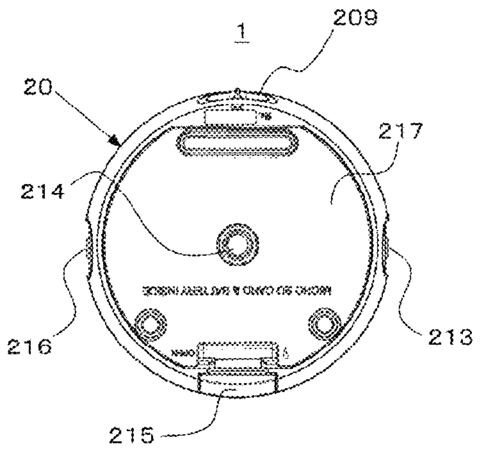
FIG. 5B is a bottom view of the microphone device.

A microphone device 1 of the present embodiment has an appearance illustrated in the six drawings of FIGS. 4A through 4D and FIGS. 5A and 5B. The microphone device 1 has a defined front (FIG. 4A), a defined rear (FIG. 4B), a defined left side (FIG. 4C), a defined right side (FIG. 4D), a defined top (FIG. 5A), and a defined bottom (FIG. 5B).

The microphone device 1 includes the microphone 10 and a body 20. The microphone 10 is identical to that in FIG. 1A and configured with the first through fourth microphone elements 11 to 14. The respective first through fourth microphone elements 11 to 14 are fixed to an upper portion of the body 20 to be directed to FLU, FRD, BRU, and BLD illustrated in FIG. 1B with reference to the front and rear, the left and right, and the top and bottom of the microphone device 1. The first through fourth microphone elements 11 to 14 are protected from collision by a metal protector 15.

As illustrated in FIG. 4A, the body 20 has the front provided with a REC LED 201A and a REMOTE terminal 215. The REC LED 201A is turned on while the microphone device 1 is recording and slowly blinks while recording is paused. The REC LED 201A rapidly blinks while the inputted signal level exceeds a threshold.

The REMOTE terminal 215 is electrically connected to a wireless adapter, not shown, a Bluetooth® adapter, for example. The microphone device 1 is allowed to wirelessly communicate via the wireless adapter with a smartphone, a tablet PC, a laptop PC, a desktop PC, and the like, not shown. Users can remotely operate the microphone device 1 using such a smartphone and the like. The microphone device 1 is capable of outputting an audio signal to, for example, a headphone, not shown, via the wireless adapter.

As illustrated in FIG. 4B, the body 20 has the rear provided with a REC LED 201B, a display 202, a REC key 203, a STOP/HOME key 204, a REW/Select key 205, a PLAY/PAUSE/ENTER key 206, an FF/Select key 207, a MENU key 208, and a Power/HOLD switch 209.

The REC LED 201B has functions identical to the REC LED 201A illustrated in FIG. 4A. Users are allowed to check the state of recording by the REC LED 201B while operating the microphone device 1.

The display 202 displays various types of information on the microphone device 1. For example, while the microphone device 1 is recording, the display 202 displays information on the recording time, the signal level of the A or B format signal, and the degree of horizontality and the degree of verticality of the body 20. As another example, while the microphone device 1 is playing back, the display 202 displays information on the playback time, the degree of horizontality, the degree of verticality, and the rotation of the body 20.

The REC key 203 is operated to start recording. The STOP/HOME key 204 is operated to stop recording or playing back and cause the display 202 to display a home screen. The REW/Select key 205 is operated to rewind the playback position of a file and select an item to be displayed on the display 202.

The PLAY/PAUSE/ENTER key 206 is operated to start playing back, pause the recording or playing back, and determine the selected item. The FF/Select key 207 is operated to fast forward the playback position of a file and select an item to be displayed on the display 202. The MENU key 208 is operated to cause the display 202 to display a MENU screen. The Power/HOLD switch 209 is operated to turn on/off the power supply of the microphone device 1 and deactivate key operations.

Figure 6:
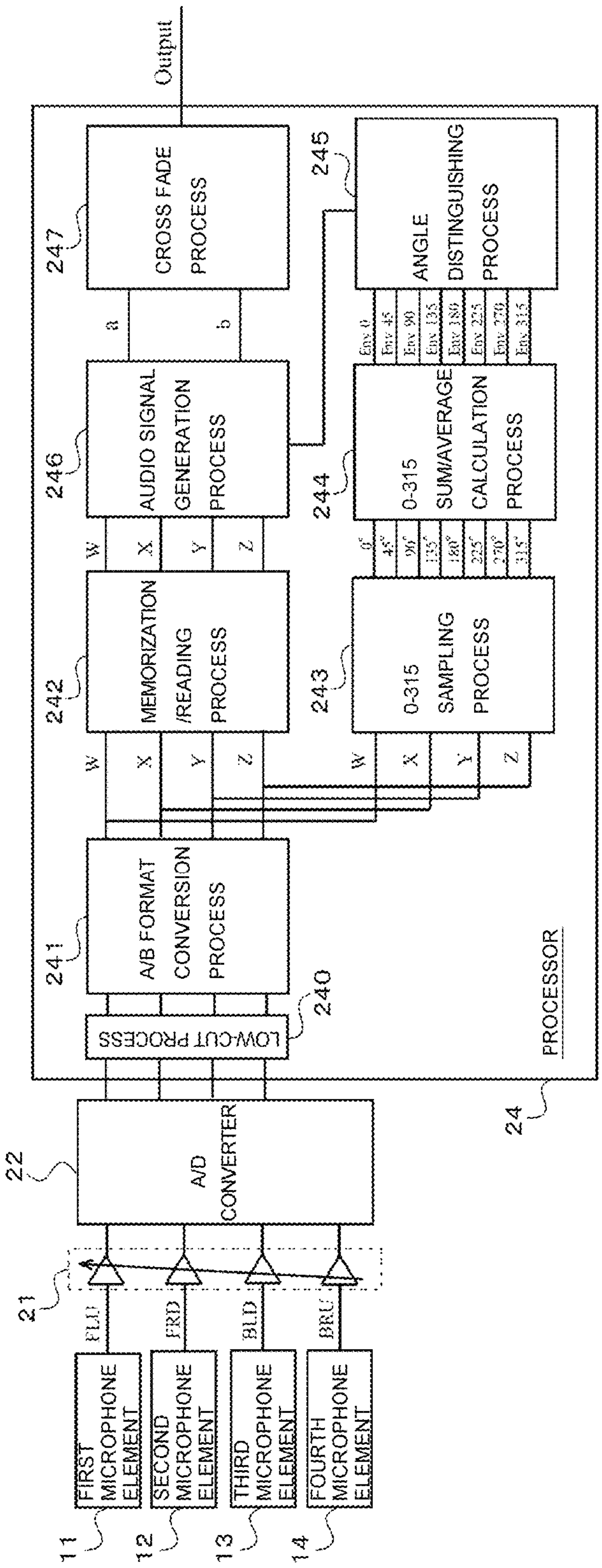
FIG. 6 is a block diagram illustrating the configuration of the microphone device.

As illustrated in FIG. 4C, the body 20 has the left side provided with a MIC GAIN dial 211, a USB terminal 212, and a LINE OUT terminal 213. The MIC GAIN dial 211 is operated to control the degree of amplification of the sound inputted from the first through fourth microphone elements 11 to 14. When the MIC GAIN dial 211 is operated, the degree of amplification of a microphone gain (amplifier) 21 illustrated in FIG. 6 is varied.

The USB terminal 212 is used to electrically connect the microphone device 1 to another device. For example, the microphone device 1 is electrically connected to a personal computer, not shown, via the USB terminal 212 to be used as, for example, a microphone for a conference system. The USB terminal 212 is connected to an AC adapter, not shown, to supply the AC power to the microphone device 1. The LINE OUT terminal 213 is used to output an audio signal to another device.

As illustrated in FIG. 4D, the body 20 has the right side provided with a VOLUME key 210 and a PHONE OUT terminal 216. The VOLUME key 210 is operated to control the volume of the sound outputted from the microphone device 1. The PHONE OUT terminal 216 is used to, for example, connect a headphone, not shown, by wire.

As illustrated in FIG. 5B, the body 20 has the bottom to which a bottom cover 217 is detachably mounted. The bottom cover 217 is detached and attached to replace an SD card and a battery, not shown, stored in the body 20. The bottom cover 217 is also provided with a threaded hole 214 at the center. The microphone device 1 is allowed to be mounted to a tripod, not shown, via the threaded hole 214.

FIG. 6 illustrates the internal structure of the microphone device 1. As illustrated in FIG. 6, the microphone device 1 is provided with the first through fourth microphone elements 11 to 14, the microphone gain 21, an A/D converter 22, and a processor 24.

The respective first through fourth microphone elements 11 to 14 pick up sound from four different directions and output first signals. The four signals outputted from the first through fourth microphone elements 11 to 14 are collectively called as a four-channel A format signal. The four-channel A format signal outputted from the first through fourth microphone elements 11 to 14 are indicated by FLU, FRD, BLD, and BRU in FIG. 6.

The four-channel A format signal outputted from the first through fourth microphone elements 11 to 14 is inputted to the microphone gain 21. The microphone gain 21 amplifies the four-channel A format signal at a degree of amplification set by the MIC GAIN dial 211 illustrated in FIG. 4C.

The four-channel A format signal amplified by the microphone gain 21 is inputted to the A/D converter 22. The A/D converter 22 converts the A format signal as an analog signal to a digital signal. The four-channel A format signal converted to the digital signal is inputted to the processor 24.

3. Process of Processor by Software

The processor 24 executes a process in accordance with the software of the present embodiment. The process of the processor 24 by the software of the present embodiment is summarized as follows: At first, the processor 24 converts an A format signal to a B format signal. Then, the processor 24 distinguishes a specific direction from a plurality of directions based on the B format signal. The processor 24 then generates and outputs an audio signal corresponding to the specific direction.

In the present embodiment, an example of using the microphone device 1 as a microphone for a conference system is described. In this case, the processor 24 distinguishes the direction of a speaker among the plurality of participants around the microphone device 1 and generates and outputs an audio signal corresponding to the direction of the speaker. In addition, every time the speaker changes, the processor 24 distinguishes the direction of a new speaker and generates and outputs an audio signal corresponding to the direction of the new speaker. Below is a description of the process of the processor 24 illustrated in FIGS. 6 and 7.

3.1 Low-Cut Process

The processor 24 executes a low-cut process 240. That is, the processor 24 removes components at a preset frequency or less from the A format signal converted to the digital signal. Users can set the frequency (cut-off frequency) subjected to the low-cut process 240 by pressing the MENU key 208 illustrated in FIG. 4B. The cut-off frequency may be set in the range, for example, from 10 to 240 Hz. The processor 24 removes the components at the cut-off frequency set by such a user or less from the A format signal. Such a low-cut process 240 removes wind noise of a fan and pop noise of the speaker from the A format signal.

3.2 A/B Format Conversion Process

The processor 24 executes an A/B format conversion process 241. That is, based on the formulae (1) through (4) above, the processor 24 converts the A format signal converted to the digital signal to a four-channel B format signal. The four-channel B format signal is indicated by W, X, Y, and Z in FIG. 6. Synthesis of the four signals W, X, Y, and Z as the elements of the B format signal allows generation of an omnidirectional audio signal including the forward and backward, left and right, and upward and downward directions.

Figure 8A:
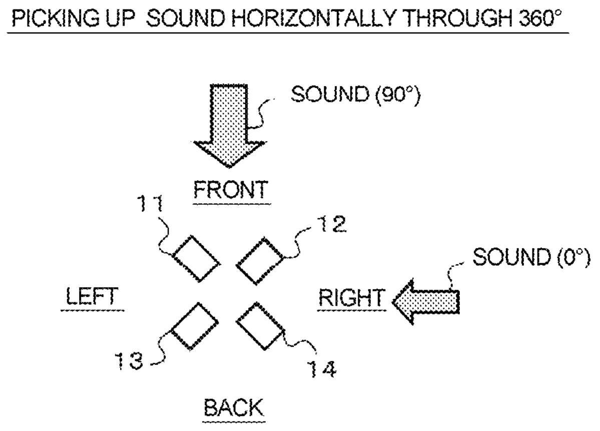
FIGS. 8A through 8C illustrate basic processes of the microphone device.

As illustrated in FIG. 8A, when the microphone device 1 is used as a microphone for a conference system, sound produced by a participant is picked up by the first through fourth microphone elements 11 to 14 horizontally through 360°. The processor 24 thus synthesizes the signals W, X, and Y of the B format signal to generate an audio signal corresponding to the specific direction in 360° horizontally. Meanwhile, when the microphone device 1 is used as the microphone for such a conference system, sound produced from the upward and downward directions may be considered to be negligible noise. Accordingly, the processor 24 does not use the signal Z of the B format signal for generation of the audio signal.

3.3 Memorization/Reading Process

The processor 24 executes a memorization/reading process 242 of the B format signal. That is, the processor 24 memorizes the four-channel B format signal W, X, Y, and Z generated by the A/B format conversion process 241 in a storage medium, not shown, exemplified by a RAM. The processor 24 also reads the signals W, X, and Y of the B format signal memorized in the RAM to generate an audio signal corresponding to the specific direction in 360° horizontally.

3.4 0-315 Sampling Process

Figure 8B:
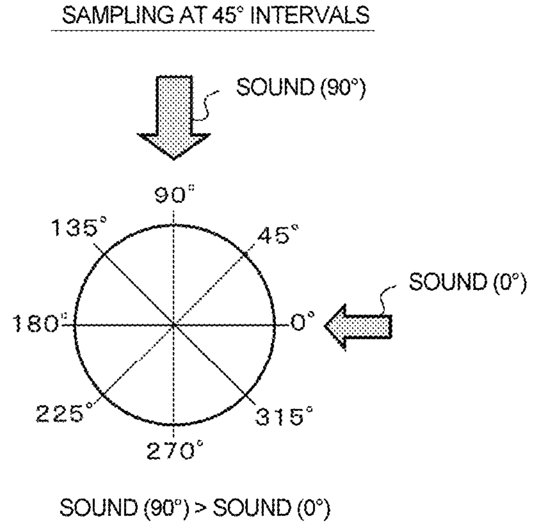

The processor 24 executes a 0-315 sampling process 243. The "0-315" means 0°, 45°, 90°, 135°, 180°, 225°, 270°, and 315°. As illustrated in FIG. 8B, in the present embodiment, sound picked up by the first through fourth microphone elements 11 to 14 horizontally through 360° is sampled at intervals of 45°.

Figure 7:
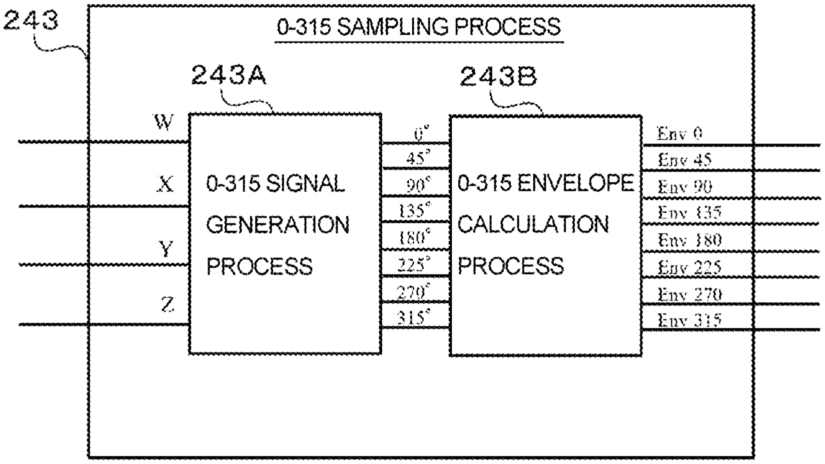
FIG. 7 is a block diagram illustrating a partial process of a processor configuring the microphone device.

The 0-315 sampling process 243 illustrated in FIG. 6 includes a 0-315 signal generation process 243A and a 0-315 envelope calculation process 243B illustrated in FIG. 7.

In the 0-315 signal generation process 243A, the processor 24 generates a plurality of signals respectively corresponding to 0°, 45°, 90°, 135°, 180°, 225°, 270°, and 315° by synthesizing the signals W, X, and Y of the B format signal.

Then, in the 0-315 envelope calculation process 243B, the processor 24 calculates Env 0, Env 45, Env 90, Env 135, Env 180, Env 225, Env 270, and Env 315, which are the envelopes of the respective plurality of signals.

3.5 0-315 Sum/Average Calculation Process As illustrated in FIG. 6, the processor 24 executes a 0-315 sum/average calculation process 244. That is, the processor 24 calculates the sum (Sum) of the respective Env 0, Env 45, Env 90, Env 135, Env 180, Env 225, Env 270, and Env 315 and then calculates the average (Ave) of each of them.

3.6 Angle Distinguishing Process

The processor 24 executes an angle distinguishing process 245. That is, the processor 24 compares the average (Ave) of each of Env 0, Env 45, Env 90, Env 135, Env 180, Env 225, Env 270, and Env 315. Based on the results of the comparison, the processor 24 then distinguishes a specific angle of any one of 0°, 45°, 90°, 135°, 180°, 225°, 270°, or 315° corresponding to the signal with the largest envelope average (Ave).

The distinguishment of the specific angle by the processor 24 is executed at predetermined time intervals. For example, the processor 24 repeatedly executes the process of distinguishing the specific angle at 33-ms intervals equivalent to one frame of a frame rate of 30 FPS. In this example, the processor 24 distinguishes the specific angle based on the envelope average (Ave) in 33 ms.

3.7 Audio Signal Generation Process

The processor 24 executes an audio signal generation process 246. That is, the processor 24 generates an audio signal corresponding to the specific angle distinguished by the angle distinguishing process 245 described above. The audio signal corresponding to the specific angle is generated by synthesizing the signals W, X, and Y of the B format signal memorized in the RAM.

Figure 8C:
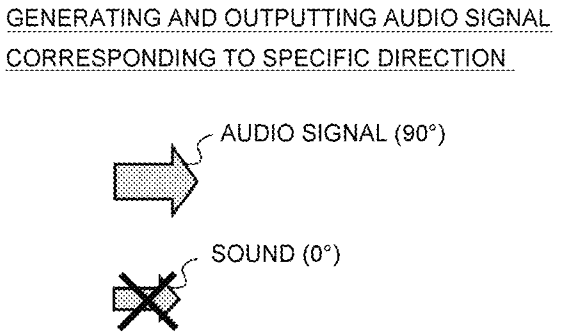

As illustrated in FIG. 8C, the processor 24 generates only the audio signal corresponding to the specific angle and does not generate an audio signal corresponding to other angles. In other words, the processor 24 outputs the audio signal in the direction of the speaker speaking in the loudest voice among the plurality of participants around the microphone device 1 and does not output audio signals in the directions of other participants. Based on the loudness of the voice, the processor 24 distinguishes the direction of the new speaker every time the speaker changes and generates and outputs an audio signal in the direction of the new speaker.

For example, the processor 24 in the angle distinguishing process 245 distinguishes the specific angle at 33-ms intervals. In this case, based on the B format signal W, X, and Y delayed 33 ms, the processor 24 in the audio signal generation process 246 generates an audio signal corresponding to the specific angle. That is, the audio signal corresponding to the specific angle is generated based on the B format signal W, X, and Y memorized in the RAM 33 ms earlier. This allows sending of the talk by the new speaker to the conference system at the other party of the conference without missing from the beginning. It should be noted that the 33-ms delayed audio signal is outputted from the microphone device 1. However, the 33 ms delay does not cause the other party of the conference to feel an incompatibility.

3.8 Cross Fade Process

The processor 24 executes a cross fade process 247. The cross fade process 247 is executed when a first speaker changes to a second speaker.

For example, it is assumed that the first speaker speaks from a specific angle a (e.g., a=00). The processor 24 distinguishes the specific angle a corresponding to the signal with the largest envelope average (Ave). The processor 24 then generates an audio signal corresponding to the specific angle a and outputs the signal from the microphone device 1.

Later, when the second speaker speaks from a specific angle b (e.g., b=90°), the processor 24 distinguishes the specific angle b corresponding to the signal with the largest envelope average (Ave). The processor 24 then generates an audio signal corresponding to the specific angle b and outputs the signal from the microphone device 1. At this point, the processor 24 executes the cross fade process 247.

In the cross fade process 247, the processor 24 gradually reduces the output level of the audio signal corresponding to the specific angle a. This causes the output of the audio signal corresponding to the specific angle a to be faded out. At the same time, the processor 24 gradually increases the output level of the audio signal corresponding to the specific angle b. This causes the output of the audio signal corresponding to the specific angle b to be faded in.

Such a cross fade process 247 can reduce the sound of noise produced when the output of the two audio signals is switched. That is, disconnection of the continuity of the signal waveform when output of the two audio signals is switched produces noise. The noise produces sound every time the speaker changes and gives the other party of the conference uncomfortable feelings. The cross fade process 247 allows reduction of the sound of noise produced when the speaker changes and allows switch of the sound of the first speaker to the sound of the second speaker without the feelings of incompatibility.

Figure 9:
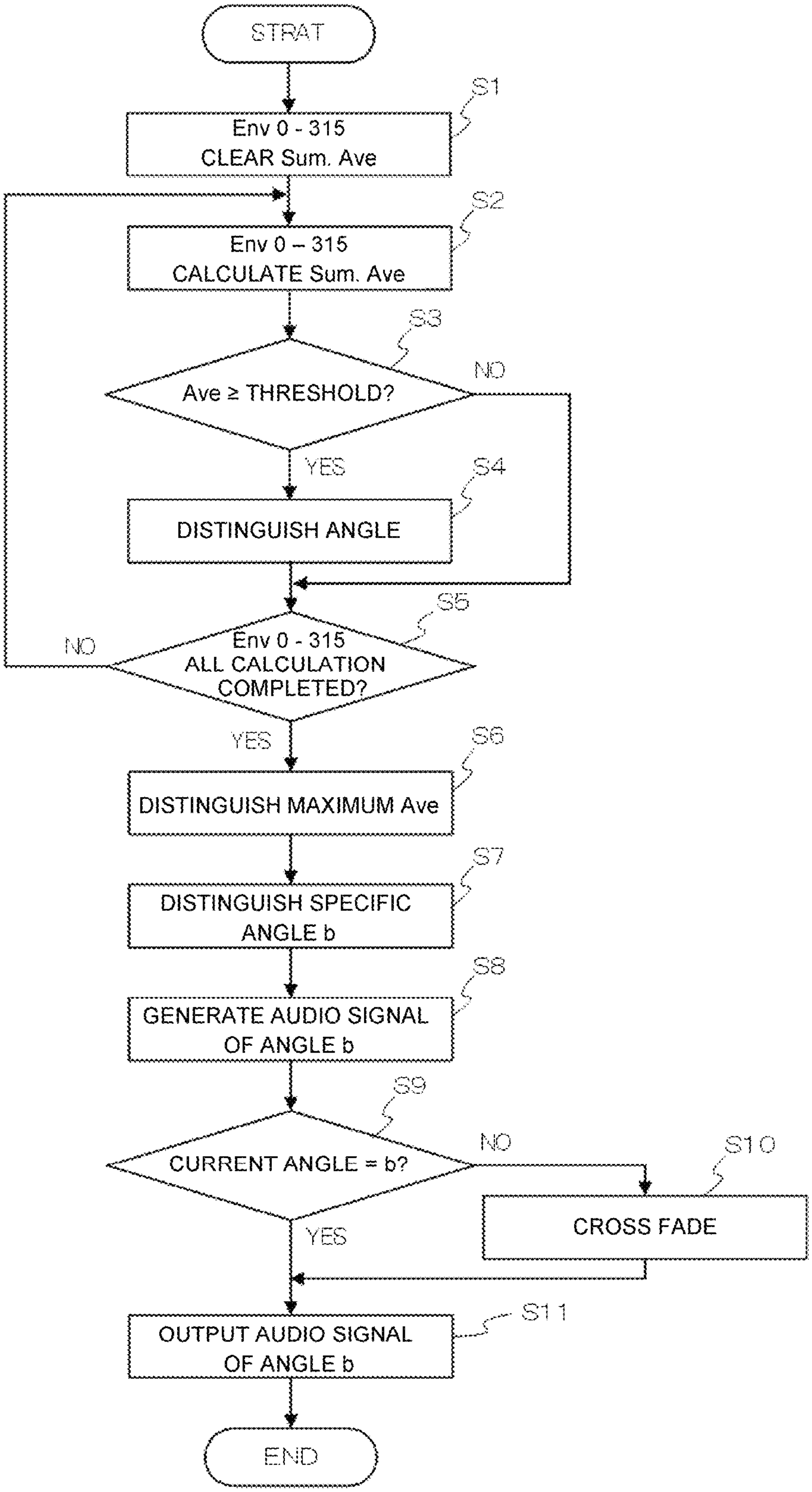
FIG. 9 is a flowchart illustrating a main process of the processor.

3.9 Process Flow of Processor With reference to FIG. 9, the process flow of the processor 24 is then described. The processor 24 generates and outputs an audio signal corresponding to the specific angle b through steps S1 to S11 illustrated in FIG. 9. Steps S1 through S11 described below are repeatedly executed at, for example, 33-ms intervals.

At step S1, the processor 24 clears the sum (Sum) and average (Ave) of each of Env 0, Env 45, Env 90, Env 135, Env 180, Env 225, Env 270, and Env 315 memorized in the process of FIG. 9 executed last time.

It should be noted that Env 0 is the envelope of a signal sampled at 0° horizontally. Env 45 is the envelope of a signal sampled at 450 horizontally. Env 90 is the envelope of a signal sampled at 900 horizontally. Env 135 is the envelope of a signal sampled at 1350 horizontally. Env 180 is the envelope of a signal sampled at 1800 horizontally. Env 225 is the envelope of a signal sampled at 225° horizontally. Env 270 is the envelope of a signal sampled at 2700 horizontally. Env 315 is the envelope of a signal sampled at 3150 horizontally.

Going on to step S2, the processor 24 firstly calculates the sum (Sum) and each average (Ave) of Env 0. For example, the processor 24 calculates the sum (Sum) and each average (Ave) of Env 0 in 33 ms.

Going on to step S3, the processor 24 determines whether the average (Ave) of Env 0 is a predefined threshold or more. If the average (Ave) of Env 0 is less than the threshold (No), the processor 24 goes on to step S5. From this point forward, the process for a signal at 0° horizontally corresponding to Env 0 is not executed. In other words, if the envelope average (Ave) is less than the threshold, no audio signal is generated for the angle corresponding to this envelope.

Meanwhile, if the average (Ave) of Env 0 is the threshold or more at step S3 (YES), the processor 24 goes on to step S4 and distinguishes the angle "0°" corresponding to Env 0. The processor 24 then goes on to step S5.

At step S5, the processor 24 determines whether the process of steps S2 through S4 is completed for all angles of Env 0, Env 45, Env 90, Env 135, Env 180, Env 225, Env 270, and Env 315. If the process of steps S2 through S4 is not completed for all angles (NO), the processor 24 repeats the process of steps S2 through S4 for all angles.

Meanwhile, if the process of steps S2 through S4 is completed for all angles at step S5 (YES), the processor 24 goes on to step S6. At step S6, the processor 24 distinguishes the largest envelope average (Ave) among the envelope averages (Ave) of the threshold or more distinguished at step S3.

Going on to step S7, the processor 24 distinguishes the specific angle b (e.g., b=90°) corresponding to the largest envelope average (Ave). Going on to step S8, the processor 24 generates an audio signal corresponding to the specific angle b. The audio signal corresponding to the specific angle b is generated by synthesizing the signals W, X, and Y of the B format signal memorized in the RAM.

Going on to step S9, the processor 24 determines whether an audio signal corresponding to the specific angle "b" is currently outputted. The currently outputted audio signal has generated by the process of FIG. 9 executed last time. If determining that the audio signal corresponding to the specific angle "b" is currently outputted (YES), the processor 24 goes on to step S11 and outputs the audio signal corresponding to the specific angle b generated at step S8.

Meanwhile, if determining that the audio signal corresponding to the specific angle "b" is not currently outputted (NO) at step S9, the processor 24 goes on to step S10 and executes the cross fade process.

For example, it is assumed that an audio signal corresponding to the specific angle a (e.g., a=0°) is currently outputted by the process of FIG. 9 executed last time. The processor 24 gradually reduces the output level of the audio signal corresponding to the specific angle a. This causes the output of the audio signal corresponding to the specific angle a to be faded out. At the same time, the processor 24 gradually increases the output level of the audio signal corresponding to the specific angle b. This causes the output of the audio signal corresponding to the specific angle b to be faded in (step S11). The cross fade process at step S10 thus allows reduction of an overlap of the sound from the two sources when the direction from which the loudest sound is produced changes.

The processor 24 then executes the process of step S11 and finishes the process illustrated in FIG. 9. Continuously, the processor 24 goes back to step S1 and repeatedly executes the process of steps S1 through S11.

4. Action and Effects

The microphone device 1 with the software of the present embodiment described above installed therein allows selective output of the sound produced from the specific direction in the space where the first through fourth microphone elements 11 to 14 are installed. That is, the processor 24 executing the process in accordance with the software of the present embodiment distinguishes the specific direction from which the loudest sound is produced in the space where the first through fourth microphone elements 11 to 14 are installed and generates and outputs an audio signal corresponding to the specific direction. Audio signals corresponding to directions other than the specific direction are not outputted. Such a process of the software in the present embodiment may be considered to reproduce the human behavior of directing a microphone to the direction from which the loudest sound is produced by the digital signal process.

In addition, the processor 24 generates and outputs only an audio signal produced from the specific direction and thus the echoing sound picked up by the microphone 10 omnidirectionally in the room and various types of noise produced inside and outside the room are greatly reduced.

Still in addition, the processor 24 removes the components at the cut-off frequency or less from the A format signal by the low-cut process 240. This causes the audio signal generated by the processor 24 to have reduced noise in the low frequency band, such as wind noise of an air conditioner and pop noise of a speaker.

5. Others

The software and the microphone device of the present invention are not limited to the embodiment described above. For example, the first order ambisonics to generate a four-channel B format signal is employed in the embodiment described above while the order of ambisonics is not limited to this. To the software and the microphone device of the present invention, higher order ambisonics of the second order or higher is applicable.

In addition, the use of the software and the microphone device is exemplified by the microphone for a conference system in the embodiment described above while the use is not limited to this. For example, the use of the software and the microphone device of the present invention may be a microphone simultaneously used with a monitoring camera. In this case, it is possible to direct the monitoring camera in a specific direction distinguished by the microphone device.

Still in addition, the software and the microphone device of the present invention is not limited to the configuration for signal processing of sound horizontally through 360° based on the signals W, X, and Y of the B format signal. The software and the microphone device of the present invention are capable of signal processing for omnidirectional sound including the forward and backward, left and right, and upward and downward directions based on all B format signal W, X, Y, and Z.

In addition, the sound horizontally through 360° is subjected to signal processing at intervals of 45° in the embodiment described above while the interval is not limited to this. The software and the microphone device of the present invention is capable of signal processing for sound horizontally through 360° at intervals other than 45°.

DESCRIPTION OF REFERENCE NUMERALS

1 Microphone Device
10 Microphone
11 First Microphone Element
12 Second Microphone Element
13 Third Microphone Element
14 Fourth Microphone Element
15 Protector
20 Body
201A, 201B REC LED
202 Display (Visual Display Device)
203 REC Key
204 STOP/HOME Key
205 REW/Select Key
206 PLAY/PAUSE/ENTER Key
207 FF/Select Key
208 MENU Key
209 Power/HOLD Switch
210 VOLUME Key
211 MIC GAIN Dial
212 USB Terminal
213 LINE OUT Terminal
214 Threaded Hole
215 REMOTE Terminal
216 PHONE OUT Terminal
217 Bottom Cover
21 Microphone Gain
22 A/D Converter
24 Processor
240 Low-Cut Process
241 A/B Format Conversion Process
242 Memorization/Reading Process
243 0-315 Sampling Process
243A 0-315 Signal Generation Process
243B 0-315 Envelope Calculation Process
244 0-315 Sum/Average Calculation Process
245 Angle Distinguishing Process
246 Audio Signal Generation Process
247 Cross Fade Process

What is claimed is:

1. A non-transitory computer readable medium, storing a software causing a processor to execute a process comprising:

converting A format signals from four or more microphone elements applicable to ambisonics to B format signals W, X, Y, and Z;

distinguishing a direction of a specific sound source from a plurality of directions contained within a peripheral 360° of the microphone elements based on at least the B format signals W, X, and Y; and generating and outputting an audio signal corresponding to the direction of the specific sound source based on at least the B format signals W, X, and Y.

2. The non-transitory computer readable medium according to claim 1, wherein the software causes the processor to execute:

a first process of converting the A format signals to the B format signals W, X, Y, and Z, where the A format signals are converted to digital signals in advance;

a second process of generating a plurality of signals corresponding to the plurality of directions based on at least the B format signals W, X, and Y;

a third process of distinguishing the direction of the specific sound source corresponding to a largest signal having a largest signal strength of the plurality of signals; and a fourth process of generating and outputting the audio signal corresponding to the direction of the specific sound source based on at least the B format signals, W, X, and Y.

3. The non-transitory computer readable medium according to claim 2, wherein the software causes the processor to execute:

in the second process, a process of calculating an envelope of each of the plurality of signals corresponding to the plurality of directions; and in the third process, a process of distinguishing the direction of the specific sound source corresponding to the signal having the largest signal strength based on the envelope.

4. The non-transitory computer readable medium according to claim 2, wherein the software causes the processor to execute:

in the first process, a process of memorizing the B format signals W, X, Y, and Z converted from the A format signals; and in the fourth process, a process of generating the audio signal corresponding to the direction of the specific sound source based on at least the memorized B format signals W, X, and Y.

5. The non-transitory computer readable medium according to claim 3, wherein the software causes the processor to execute:

in the first process, a process of memorizing the B format signals W, X, Y, and Z converted from the A format signals; and in the fourth process, a process of generating the audio signal corresponding to the direction of the specific sound source based on at least the memorized B format signals W, X, and Y.

6. A microphone device including the non-transitory computer readable medium according to any one of claims 1 through 4 installed therein, the device comprising:

a body of the microphone;

the four or more microphone elements provided facing sound pickup directions different from each other in the body and configured to output the A format signals;

an amplifier configured to amplify the A format signals outputted from the four or more microphone elements;

an A/D converter configured to convert the A format signals amplified by the amplifier to digital signals; and the processor configured to process the A format signals converted to the digital signals by the A/D converter in accordance with the software.

7. A microphone device including the non-transitory computer readable medium according to claim 5 installed therein, the device comprising:

a body of the microphone;

the four or more microphone elements provided facing sound pickup directions different from each other in the body and configured to output the A format signals;

an amplifier configured to amplify the A format signals outputted from the four or more microphone elements;

an A/D converter configured to convert the A format signals amplified by the amplifier to digital signals; and the processor configured to process the A format signals converted to the digital signals by the A/D converter in accordance with the software.

* * * * *